3,073,844
FLUORINATED CYCLIC SULFIDES AND THEIR PREPARATION

Carl G. Krespan, Wilmington, Del., assignor to E. I. du Pont de Nemours and Company, Wilmington, Del., a corporation of Delaware
No Drawing. Filed Apr. 24, 1959, Ser. No. 808,584
18 Claims. (Cl. 260—327)

This invention relates to new fluorine-containing heterocyclic compounds. More particularly, it relates to fluorinated cyclic sulfides having intracyclic unsaturation and to methods for their preparation.

This application is a continuation-in-part of my copending application Serial Number 742,715, filed June 18, 1958, and now abandoned.

In spite of the continuously increasing technical importance of fluorinated organic compounds, very few fluorine-containing heterocyclic sulfur compounds are known. One reason for the present meager knowledge of such compounds is that no method has heretofore been known for synthesizing ring-unsaturated, fluorinated cyclic sulfides from unsaturated compounds generally.

This invention provides a process of preparing fluorinated cyclic sulfides which comprises maintaining at reaction temperature an intimate mixture of a bis(polyfluoroalkyl)-1,2-dithietene of the formula

where $R_f$ is a perfluoroalkyl, $\omega$-hydroperfluoroalkyl, or $\omega$-chloroperfluoroalkyl radical, with a compound having aliphatic or alicyclic carbon-to-carbon unsaturation, until a cyclic sulfide having from five to six annular atoms is formed.

The new products made available by this invention comprise the equimolar addition products of the above-defined bis(polyfluoroalkyl)-1,2-dithietene with the compound having aliphatic or alicyclic unsaturation. These equimolar adducts are six-membered cyclic 1,4-bisulfides having polyfluoroalkyl groups on the 2- and 3-carbon atoms. They belong to one or the other of the following classes:

I. When the unsaturate is acetylenic, the cyclic bisulfide has the formula

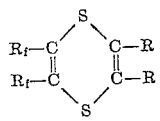

where the $R_f$'s are perfluoroalkyl, $\omega$-hydroperfluoroalkyl or $\omega$-chloroperfluoroalkyl radicals and the R's are hydrogen or monovalent radicals. These compounds are the 1,4-dithia-2,3-bis(polyfluoroalkyl)cyclohexa-2,5 - dienes. In accordance with the accepted nomenclature of heterocyclic compounds (see "The Ring Index" by Patterson and Capell, 1940), they can also be called 2,3-bis(polyfluoroalkyl)-1,4-dithiins.

II. When the unsaturate is ethylenic (aliphatic or alicyclic), the cyclic bisulfide has the formula

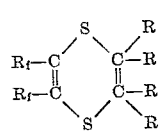

where $R_f$ is a perfluoroalkyl, $\omega$-hydroperfluoroalkyl or $\omega$-chloroperfluoroalkyl radical and the R's are hydrogen or monovalent radicals, or two of the R's on adjacent annular carbons can be joined together in a ring structure. These compounds are the 1,4-dithia-2,3-bis(polyfluoroalkyl)-2-cyclohexenes which can also be called 2,3-bis(polyfluoroalkyl)-5,6-dihydro-1,4-dithiins.

Cyclic sulfides of a third type are also often obtained in the process of this invention when the unsaturated compound reacted with the bis(polyfluoroalkyl)-1,2-dithietene is acetylenic. These cyclic sulfides are the 2,3-bis(polyfluoroalkyl)thiophenes of the formula

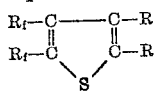

where $R_f$ is a perfluoroalkyl, $\omega$-hydroperfluoroalkyl or $\omega$-chloroperfluoroalkyl radical and the R's are hydrogen or monovalent radicals. It is believed that these thiophenes are secondary reaction products derived, by loss of one sulfur atom, from the 1,4-dithia-2,3-bis(polyfluoroalkyl)-cyclohexa-2,5-dienes initially formed. In certain cases, depending on the nature of the radicals attached to the triply bonded carbon atoms of the acetylenic compound and on the reaction conditions, especially the temperature, these thiophenes are formed in substantial amounts, or even nearly exclusively. The 2,3-bis(polyfluoroalkyl) thiophenes in which the 4- and 5-carbon atoms are attached to hydrogen or hydrocarbon radicals are also new products made available by this invention.

Another type of cyclic sulfide which is occasionally obtained when using acetylenic unsaturates is the addition product of two moles of the bis(polyfluoroalkyl)-1,2-dithietene to one mole of the acetylenic compound. These by-products are bicyclic sulfides having the structure of a 1,4,5,8-tetrathiabicyclo[4.4.0]-2,3,6,7 - tetrakis(polyfluoroalkyl)-deca-2,6-diene

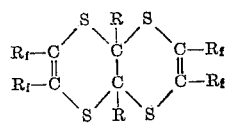

where $R_f$ is perfluoroalkyl, $\omega$-hydroperfluoroalkyl or $\omega$-chloroperfluoroalkyl and the R's are hydrogen or monovalent radicals. When these adducts are present in the reaction product, they are generally found in only minor amounts, unless the operating conditions, particularly the relative amounts of reactants, are so as chosen that the formation of these adducts is favored.

One of the two reactants employed in the process of this invention is a compound having aliphatic or alicyclic, i.e., cycloaliphatic, carbon-to-carbon unsaturation. The aliphatic unsaturation may be ethylenic or acetylenic; the alicyclic unsaturation is normally ethylenic since very few compounds having intracyclic triple bonds are known. Any compound having aliphatic or alicyclic carbon-to-carbon unsaturation is operable in this process. The preferred compounds from the standpoint of accessibility and ease of reaction are those which contain from 2–14 carbon atoms and in which the multiply bonded carbon atoms, i.e., the two carbon atoms connected by the multiple bond, are attached to hydrogen or halogen or to hydrocarbon, oxyhydrocarbon (i.e, oxygen-interrupted hydrocarbon), thiahydrocarbon (i.e., sulfur-interrupted hydrocarbon), halohydrocarbon, or hydrocarbonoxycarbonyl (—COOR, where R is hydrocarbon) radicals. The unsaturates suitable for use in the present invention are known compounds, either commercially available or obtainable by known methods.

The other reactant employed in carrying out the process of this invention is a bis(polyfluoroalkyl)-1,2-dithietene of the formula

where $R_f$ stands for a perfluoroalkyl, ω-hydroperfluoroalkyl or ω-chloroperfluoroalkyl radical. These compounds, which can also be called 1,2-dithia-3,4-bis(polyfluoroalkyl)cyclobut-3-enes, are prepared according to the method described in my above-mentioned copending application Serial No. 742,715. This method consists in heating, at a temperature of at least 150° C., a mixture of sulfur and a bis(polyfluoroalkyl)acetylene of the formula $R_f$—C≡C—$R_f$, where $R_f$ has the significance given above. The reaction can be carried out in a sealed vessel under the autogenous pressure developed by the reactants at the operating temperature, or by passing vapors of the bis(polyfluoroalkyl)acetylene through the vapors of refluxing sulfur at its boiling point (444° C.).

The precursors of these 1,2-dithietenes, i.e., the bis(polyfluoroalkyl)acetylenes, are obtainable as follows: The bis(perfluoroalkyl)acetylenes may be prepared by the process described in U.S. Patent 2,546,997. The bis(ω-hydroperfluoroalkyl)acetylenes can be prepared by reacting an ω-hydroperfluorocarboxylic acid chloride with 1,1-dichloro-2,2-difluoroethylene at 140–150° C. in the presence of nickel carbonyl catalyst, whereby carbon monoxide and chlorine are removed from the acid chloride and addition takes place to give an α,α′-dichloro-ω,ω′-dihydroperfluoroalkene of the formula $$H(CF_2)_nCF_2CCl=CClCF_2(CF_2)_nH$$

On removal of chlorine from the dichloroolefin, e.g., by treatment with magnesium in tetrahydrofuran medium or with zinc in acetic anhydride, there is obtained the bis(ω-hydroperfluoroalkyl)acetylene, $$H(CF_2)_nCF_2-C≡C-CF_2(CF_2)_nH$$

The first member of this series of compounds, bis(difluoromethyl)acetylene, is described in U.S. Patent 2,558,875.

The bis(ω-chloroperfluoroalkyl)acetylenes are prepared from the α,α,α,ω-tetrachloroperfluoroalkanes of the type $Cl(CF_2)_nCCl_3$, which are themselves made by teleomerization of tetrafluoroethylene with carbon tetrachloride. Upon treatment with copper or with zinc activated with copper in ether, the α,α,α,ω-tetrachloroperfluoroalkane couples with loss of chlorine to yield the corresponding tetrachloroperfluoroolefin, $$2Cl(CF_2)_nCCl_3 \xrightarrow{Cu} Cl(CF_2)_nCCl=CCl(CF_2)_nCl$$

The tetrachloroperfluoroolefin is then dehalogenated by treatment with magnesium in tetrahydrofuran or with zinc in acetic anhydride to give the bis(ω-chloroperfluoroalkyl)acetylene, $Cl(CF_2)_nC≡C(CF_2)_nCl$. The first member of this series of compounds, bis(chlorodifluoromethyl)acetylene, is described in U.S. Patent 2,522,566.

The most readily accessible bis(polyfluoroalkyl)-1,2-dithietenes are those in which each polyfluoroalkyl group has from 1–12 carbon atoms, and these are therefore a preferred group. Especially preferred are the bis(perfluoroalkyl)-1,2-dithietenes in which the perfluoroalkyl groups have from 1–6 carbon atoms. In most of the examples which follow, the starting material was bis(trifluoromethyl)-1,2-dithietene $$\begin{array}{c} F_3C-C-S \\ \parallel \phantom{-} \vert \\ F_3C-C-S \end{array}$$

a liquid boiling at 91–92° C. at 760 mm. Other bis(polyfluoroalkyl)-1,2-dithietenes as described above are equally suitable for use in the proces of the invention.

The relative proportions of the two reactants are not critical, since formation of a cyclic sulfide takes place regardless of what these proportions are. Since the bis(polyfluoroalkyl)-1,2-dithietene is normally the more expensive reactant, it is desirable to utilize it as completely as possible. For this reason, the other reactant, i.e., the compound having aliphatic or alicyclic unsaturation, is desirably, though by no means necessarily, used in amounts of at least one mole, preferably from one to two moles, per mole of bis(polyfluoroalkyl)-1,2-dithietene.

A solvent or diluent for the reaction is not necessary. However, a solvent can optionally be used to facilitate contact between the reactants. For this purpose, any organic liquid free of aliphatic or alicyclic unsaturation and otherwise essentially inert towards the reactants can be employed.

The reaction temperature is not critical. In fact, with the more reactive unsaturates, such as the vinyl alkyl ethers, the reaction is exothermic and proceeds spontaneously upon mixing the reactants at ordinary temperature. In general, a reaction temperature of at least 0° C. is desirable to achieve a practical reaction rate. With the less reactive unsaturates, heating at moderately high temperatures, e.g., in the range of 50–150° C., is recommended. The temperature can be as high as the decomposition point of the reactants but in general it is unnecessary to exceed about 250° C. In this connection, it should be noted that, at temperatures of the order of 150° C. or higher, some at least of the six-membered cyclic bisulfides tend to lose one atom of sulfur to give the corresponding thiophene derivatives. Thus, if the cyclic bisulfides are the products primarily desired, it is advantageous to operate below about 150° C.

The reaction can be interrupted as soon as an appreciable amount of a cyclic sulfide having from 5 to 6 annular atoms [i.e., at least on more annular atom than the starting bis(polyfluoroalkyl)-1,2-dithietene] has formed. Substantial conversions are generally obtained after a contact time of one hour or less at the operating temperature, but it is not harmful, and it is often advantageous, to extend the reaction time much beyond this, e.g., up to 30 hours or more, depending on the reactivity of the unsaturate.

When the unsaturate is relatively non-volatile, the reaction can be carried out at atmospheric pressure and at temperatures up to the boiling point of the reactant mixture. When the unsaturate is gaseous or low boiling, it is desirable to conduct the reaction in sealed vessels at the autogenous pressure developed by the reaction mixture at the operating temperature. However, additional pressure, either of the gaseous reactant or of an inert gas, can be used if desired.

The cyclic sulfides produced in this reaction can be readily separated from the unchanged reactants or by-products by conventional methods such as fractional distillation, preferably under reduced pressure, crystallization, sublimation, chromatography, and the like. These products vary in physical properties from relatively high boiling liquids to crystalline solids which can be low melting or high melting, depending on the nature of the ring substituents. The six-membered cyclic bisulfides are stable at ordinary or moderately high temperatures but, as already mentioned, upon heating to higher temperatures, e.g., of the order of 150° C. or higher, they tend to lose one atom of sulfur, thus giving the corresponding five-membered cyclic monosulfides, i.e., the thiophenes or 2,3-dihydrothiophenes. This tendency is especially marked with the 1,4-dithiacyclohexa-2,5-dienes.

The invention is illustrated in greater detail by the following examples.

*Example I*

A mixture of 22.6 g. (0.1 mole) of bis(trifluoromethyl)-1,2-dithietene, $$\begin{array}{c} F_3C-C=C-CF_3 \\ \vert \phantom{===} \vert \\ S-S \end{array}$$

5 g. (0.18 mole) of ethylene and 20 ml. of cyclohexane was heated in a bomb with agitation for 12.5 hours at 150° C. under autogenous pressure. Distillation of the reaction mixture gave, as the main product, 6.2 g. of a liquid boiling at 106° C. at 25 mm. pressure, which crystallized to a solid melting at 29° C. This material was 1,4-dithia-2,3-bis(trifluoromethyl)-2-cyclohexene,

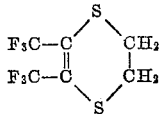

*Analysis.*—Calcd. for C₆H₄F₆S₂: C, 28.35; H, 1.59; F, 44.84; S, 25.22. Found: C, 28.69; H, 1.63; F, 45.57; S, 25.28.

The nuclear magnetic resonance, infrared and ultraviolet spectra confirmed the identity of the compound.

*Example II*

A mixture of 2.26 g. (0.010 mole) of bis(trifluoromethyl)-1,2-dithietene and 0.90 g. (0.011 mole) of cyclohexene was allowed to stand at room temperature for two days, then heated to reflux (about 90° C.) for 15 hours. On cooling there was obtained 1.12 g. of a crystalline precipitate of 1,4-dithia-2,3-bis(trifluoromethyl)-5,6-tetramethylene-2-cyclohexene,

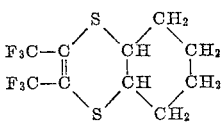

This product had a melting point of 67–68° C. after recrystallization from aqueous ethanol.

*Analysis.*—Calcd. for C₁₀H₁₀F₆S₂: C, 38.96; H, 3.27; F, 36.98; S, 20.80. Found: C, 39.16; H, 3.50; F, 37.12; S, 20.29.

The infrared and nuclear magnetic resonance spectra agreed with the assigned structure.

*Example III*

In this example, bis(trifluoromethyl)-1,2-dithietene was formed in situ by reaction of sulfur with hexafluorobutyne-2, F₃C—C≡C—CF₃, and reacted as it formed with butene-2.

A mixture of 6.4 g. (0.20 mole) of sulfur, 30 g. (0.17 mole) of hexafluorobutyne-2 and 11 g. (0.20 mole) of trans-butene-2 in 20 ml. of cyclic tetramethylenesulfone as the diluent was heated in a bomb with agitation for 12 hours at 160° C. under autogenous pressure. Distillation of the reaction product gave, as a first fraction, 8.4 g. of a liquid boiling at 81–84° C. at 170 mm. pressure, which was tetrakis(trifluoromethyl)thiophene,

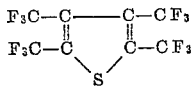

then, as a second fraction, 2.4 g. of a liquid boiling at 75–76° C. at 5 mm. pressure, which was shown by elemental, infrared and nuclear magnetic resonance analysis to be 1,4-dithia-2,3-bis(trifluoromethyl)-5,6-dimethyl-2-cyclohexene,

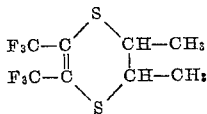

*Analysis.*—Calcd. for C₈H₈F₆S₂: C, 34.04; H, 2.84; F, 40.42; S, 22.69. Found: C, 35.34; H, 3.29; F, 40.74; S, 21.29.

*Example IV*

A mixture of 15.4 g. (0.067 mole) of bis(trifluoromethyl)-1,2-dithietene and 14 g. (0.14 mole) of tetrafluoroethylene was heated in a bomb with agitation at 155° C. for 9.5 hours under autogenous pressure. Distillation of the reaction mixture gave, first 0.65 g. of a liquid, B.P. 80–84° C., which was shown by its nuclear magnetic resonance spectrum to be 2,3-bis(trifluoromethyl)-4,4,5,5-tetrafluoro-4,5-dihydrothiophene,

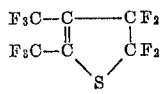

The second fraction (1.26 g.) was a liquid boiling at 62–64° C. at 100 mm. pressure, which was shown by elemental and nuclear magnetic resonance analysis to be 1,4-dithia-2,3-bis(trifluoromethyl)-5,5,6,6-tetrafluoro-2-cyclohexene,

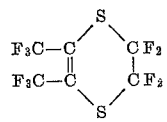

*Analysis.*—Calcd. for C₆F₁₀S₂: F, 58.25; S, 19.66. Found: F, 58.09; S, 18.82.

*Example V*

A mixture of 11.3 g. (0.05 mole) of bis(trifluoromethyl)-1,2-diethietene and 4.6 g. (0.055 mole) of tetramethylethylene was heated in a bomb with agitation at 100° C. for 20 hours. Distillation of the reaction product gave 7.3 g. of a liquid boiling at 84° C. at 4 mm., which solidified to a solid melting at 21–22° C. This product was 1,4-dithia-2,3-bis(trifluoromethyl)-5,5,6,6-tetramethyl-2-cyclohexene,

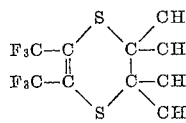

*Analysis.*—Calcd. for C₁₀H₁₂F₆S₂: C, 38.70; H, 3.90; F, 36.74; S, 20.66. Found: C, 38.61; H, 3.92; F, 36.93; S, 21.26.

The infrared, ultraviolet and nuclear magnetic resonance spectra supported this structure.

*Example VI*

A mixture of 11.3 g. (0.05 mole) of bis(trifluoromethyl)-1,2-dithietene and 9.0 g. (0.05 mole) of trans-stilbene in 10 ml. of dry n-hexane was heated at 100° C. for 30 hours in a bomb with agitation. From the reaction product was isolated 7.4 g. of a solid which, after recrystallization from n-hexane, melted at 160–162° C. with sublimation. This was 1,4-dithia-2,3-bis(trifluoromethyl)-5,6-diphenyl-2-cyclohexene,

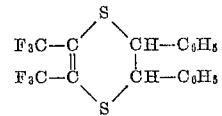

*Analysis.*—Calcd. for C₁₈H₁₂F₆S₂: C, 53.20; H, 2.98; F, 28.05; S, 15.78. Found: C, 53.24; H, 3.09; F, 28.06; S, 15.67.

*Example VII*

Upon mixing 11.3 g. (0.05 mole) of bis(trifluoromethyl)-1,2-dithietene with 4.3 g. (0.06 mole) of ethyl vinyl ether, an exothermic reaction took place. After this reaction had subsided, distillation of the reaction product gave 7.4 g. of a distillate boiling at 79° C. at 2 mm. This product was identified by elemental, infrared and nuclear magnetic resonance analysis as 1,4-dithia-2,3-bis(trifluoromethyl)-5-ethoxy-2-cyclohexene,

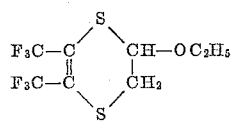

*Analysis.*—Calcd. for C₈H₈F₆OS₂: C, 33.21; H, 2.70;

F, 38.22; S, 21.50. Found: C, 32.35; H, 2.82; F, 38.83; S, 21.75.

Example VIII

A mixture of 20 g. (0.09 mole) of bis(trifluoromethyl)-1,2-dithietene and 30 g. (0.18 mole) of hexafluorobutyne-2 was heated in a bomb with agitation at 100° C. for 4 hours under autogenous pressure. Distillation of the reaction product gave 13.4 g. of a first fraction, boiling between 70° C. at 90 mm. and 54° C. at 25 mm. This was a mixture of tetrakis(trifluoromethyl)thiophene and 1,4-dithia-2,3,5,6-tetrakis(trifluoromethyl)cyclohexa - 2,5-diene. The second fraction (11.4 g.) boiled at 54–55° C. at 25 mm. and solidified to a solid melting at 24–25° C. This was pure 1,4-dithia-2,3,5,6-tetrakis(trifluoromethyl) cyclohexa-2,5-diene,

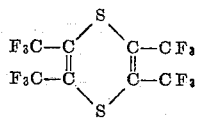

Analysis.—Calcd. for $C_8F_{12}S_2$: C, 24.75; F, 58.73; S, 16.52. Found: C, 25.02; F, 59.16; S, 16.01.

Infrared and nuclear magnetic resonance analysis confirmed the identity of the product.

Example IX

A mixture of 14.5 g. (0.064 mole) of bis(trifluoromethyl)-1,2-dithietene and 7.1 g. (0.070 mole) of phenylacetylene in 15 ml. of methanol was heated to reflux (about 100° C.) for 4 hours. Evaporation of the reaction mixture at 60–65° C. under 0.6–1 mm. pressure gave 8.2 g. of residual reaction product as a viscous oil. This was shown by nuclear magnetic resonance analysis to be 1,4-dithia - 2,3 - bis(trifluoromethyl)-5-phenylcyclohexa - 2,5-diene,

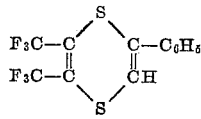

On attempted distillation, the product lost elemental sulfur and gave a liquid distillate, B.P. 59–61° C. at 0.25 mm., which was shown by nuclear magnetic resonance analysis to be 2,3-bis(trifluoromethyl)-4(or 5)-phenylthiophene.

Example X

A mixture of 11.3 g. (0.05 mole) of bis(trifluoromethyl-1,2-dithietene and 4.5 g. (0.055 mole) of hexyne-3 was allowed to stand at room temperature (about 20° C.) for 18 days. Distillation of the reaction mixture gave 2.3 g. of a yellow oil, B.P. 77–79° C. at 4 mm., which was shown by elemental, infrared and nuclear magnetic resonance analysis to be 1,4-dithia-2,3-bis(trifluoromethyl)-5,6-diethylcyclohexa-2,5-diene,

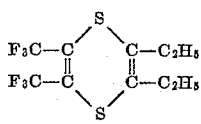

Analysis.—Calcd. for $C_{10}H_{10}F_6S_2$: C, 38.96; H, 3.27; F, 36.98; S, 20.80; M.W. 308. Found: C, 39.48; H, 3.27; F, 36.93; S, 20.21; M.W., 291.

From the distillation residue in this preparation was obtained 0.9 g. of a solid melting at 132–133° C. after successive crystallizations from methanol and benzene. This material was the addition product of two moles of bis(trifluoromethyl)-1,2-dithietene to one mole of hexyne-3. It was shown by elemental, infrared and nuclear magnetic reasonance analysis to be 1,4,5,8-tetrathiabicyclo- [4.4.0] - 2,3,6,7 - tetrakis(trifluoromethyl) - 9,10 - diethyldeca-2,6-diene,

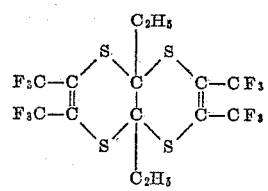

Analysis.—Calcd. for $C_{14}H_{10}F_{12}S_4$: C, 31.46; H, 1.87; F, 42.69; S, 23.97. Found: C, 31.58; H, 2.02; F, 42.74; S, 23.96.

Example XI

A mixture of 22.6 g. (0.10 mole) of bis(trifluoromethyl)-1,2-dithietene, 5 g. (0.20 mole) of acetylene and 20 ml. of cyclohexane was heated in a bomb with agitation at 125° C. for 8 hours under autogenous pressure. Distillation of the reaction mixture gave 2.1 g. of a liquid boiling at 69–70° C. at 150 mm. pressure, which was identified by elemental, infrared and nuclear magnetic resonance analysis as 2,3-bis(trifluoromethyl)thiophene,

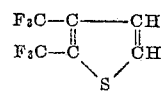

Analysis.—Calcd. for $C_6H_2F_6S$: C, 32.73; H, 0.92; F, 51.78; S, 14.56. Found: C, 32.57; H, 1.10; F, 51.91; S, 14.55.

There was also obtained 7.2 g. of a solid, volatile at 150° C. at 5 mm. pressure and melting at 123° C. This product was 1,4,5,8-tetrathiabicyclo[4.4.0]-2,3,6,7-tetrakis(trifluoromethyl)deca-2,6-diene,

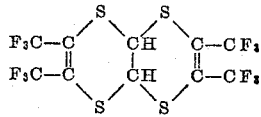

i.e., the addition product of two moles of bis(trifluoromethyl)-1,2-dithietene to one mole of acetylene.

Analysis.—Calcd. for $C_{10}H_2F_{12}S_4$: C, 25.11; H, 0.42; F, 47.66; S, 26.81; M.W., 478. Found: C, 25.24; H, 0.66; F, 47.64; S, 26.65; M.W., 490.

The nuclear magnetic resonance spectrum confirmed the assigned structure.

Example XII

This example uses the reactants of the preceding example, but under somewhat different conditions.

A mixture of 45.2 g. (0.20 mole) of bis(trifluoromethyl)-1,2-dithietene and 13 g. (0.50 mole) of acetylene in 50 ml. of dry benzene was heated in a bomb with agitation at 50° C. for 40 hours, then at 70° C. for 15 hours. On distillation of the reaction product there was recovered about 37% of the bis(trifluoromethyl)-1,2-dithietene unreacted. There was then obtained 1.5 g. of a distillate boiling at 48° C. at 10 mm., which was shown by elemental, infrared, ultraviolet and nuclear magnetic resonance analysis to be 1,4-dithia-2,3-bis(trifluoromethyl)cyclohexa-2,5-diene,

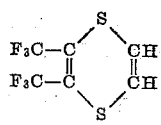

Analysis.—Calcd. for $C_6H_2F_6S_2$: C, 28.57; H, 0.80; F, 45.20; S, 25.42. Found: C, 28.29; H, 1.07; F, 45.25; S, 25.62.

The distillation residue contained the dimer of bis(trifluoromethyl)-1,2-dithietene in an amount corresponding to 22% of the starting material. This product, M.P.

110–111° C. after sublimation, is 1,2,5,6-tetrathia-3,4,7,8-tetrakis(trifluoromethyl)cyclooeta-3,7-diene,

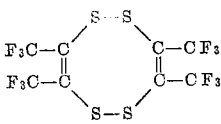

*Example XIII*

A mixture of 11.3 g. (0.05 mole) of bis(trifluoromethyl)-1,2-dithietene and 7.8 g. (0.055 mole) of dimethyl acetylenedicarboxylate in 15 ml. of methanol was heated to reflux (about 80° C.) for 8 hours. Distillation of the reaction product under reduced pressure gave a liquid, B.P. 76–78° C. at 0.5 mm. that turned purple as it came through the stillhead and solidified in the receiver to a purple solid. When exposed to the air this solid turned yellow, presumably owing to the liberated sulfur changing from an active form to normal sulfur. After recrystallization from petroleum ether this product (5.4 g.) was obtained as white crystals, M.P. 49° C. Elemental, infrared and nuclear magnetic resonance analysis showed that it was 2,3-bis(trifluoromethyl)-4,5-dimethoxycarbonylthiophene,

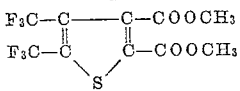

*Analysis.*—Calcd. for $C_{10}H_6F_6O_4S$: C, 35.72; H, 1.80; F, 33.91; S, 9.54. Found: C, 36.09; H, 2.06; F, 33.62; S, 9.71.

*Example XIV*

A mixture of 6.2 g. (0.017 mole) of bis($\beta$-chlorotetrafluoroethyl)-1,2-dithietene

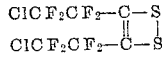

prepared by passing bis($\beta$-chlorotetrafluoroethyl)acetylene through sulfur vapor at about 444° C. and atmospheric pressure, and 2.3 g. (0.02 mole) of vinyl n-butyl sulfide was heated at 100° C. for 20 hours, then at 150° C. for 3 hours, under autogenous pressure. Distillation of the reaction product gave 1.7 g. of unreacted bis($\beta$-chlorotetrafluoroethyl)-1,2-dithietene, B.P. 45–52° C. at 5 mm., and 2.5 g. of 1,4-dithia-2,3-bis($\beta$-chlorotetrafluoroethyl)-5-butylthio-2-cyclohexene

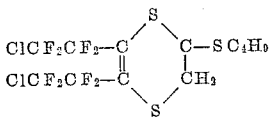

B.P. 125–127° C. at 1 mm.

*Analysis.*—Calcd. for $C_{12}H_{12}Cl_2F_8S_3$: F, 31.98; S, 20.23. Found: F, 31.98; S, 20.65.

The bis($\beta$-chlorotetrafluoroethyl)acetylene used as the starting material in this example was prepared as follows:

A. A mixture of 187 g. of 1,3,3,3-tetrachloro-1,1,2-,2-tetrafluoropropane (which can be prepared as described by Coffman et al. in J. Am. Chem. Soc. 71, 979 (1949)), and 114 g. of copper powder was heated in an agitated bomb at 180° C. for 15 hours. The reaction product was extracted continuously with methylene chloride for 10 hours. Distillation of the extract gave 88 g. of 1,3,4,6-tetrachloro-1,1,2,2,5,5,6,6-octafluoro-3-hexene,

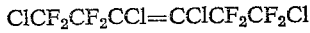

B.P. 95–98° C. at 100 mm.

*Analysis.*—Calcd. for $C_6Cl_4F_8$: Cl, 31.77; F, 41.54. Found: Cl, 31.49; F, 41.55.

B. A flask fitted with a stirrer, a dropping funnel and a short distilling column was charged with 20 g. of zinc dust and 60 ml. of acetic anhydride. The mixture was heated until the head temperature reached 135° C., and then a solution of 44.2 g. of

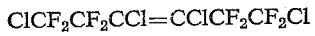

in 20 ml. of acetic anhydride was added in small portions over a period of four hours. During this time the reaction product was removed continuously at a head temperature of 83–93° C. There was obtained 36.5 g. of colorless distillate which was washed with water, 5% sodium bicarbonate and again with water to remove co-distilled acetic anhydride. After drying over sodium sulfate, the product was distilled, giving 25 g. of bis($\beta$-chlorotetrafluoroethyl)acetylene, B.P. 82–84° C., $n_D^{24}$, 1.3210.

*Analysis.*—Calcd. for $C_6Cl_2F_8$: C, 24.43; Cl, 24.04; F, 51.53. Found: C, 25.24; Cl, 24.44; F, 51.61.

The infrared and nuclear magnetic resonance spectra supported the assigned structure.

While the invention has been illustrated in the foregoing examples with reference to certain specific reactants, the process is broadly applicable to the reaction of any bis(polyfluoroalkyl)-1,2-dithietene as defined above with any unsaturate having aliphatic or alicyclic carbon-to-carbon unsaturation. Thus, the invention is further exemplified by the additional illustrative reaction products named below, which can be produced from the named reactants by application of the described process:

1,4-dithia-2,3-bis($\omega$-hydroperfluoropentyl)-5,5-dimethyl-2-cyclohexene, from bis($\omega$-hydroperfluoropentyl)-1,2-dithietene and isobutylene.

1,4-dithia-2-trifluoromethyl-3-perfluoroethyl-5-(n-dodecyl)-2-cyclohexene, from 3-trifluoromethyl-4-perfluoroethyl-1,2-dithietene and tetradecene-1.

1,4-dithia-2,3-bis(difluoromethyl)-5-phenyl-2-cyclohexene, from bis(difluoromethyl)-1,2-dithietene and styrene.

1,4-dithia-2,3-bis(perfluorohexyl)-5,6-dimethylene-2-cyclohexene, from bis(perfluorohexyl)-1,2-dithietene and cyclobutene.

1,4-dithia-2,3-bis($\omega$-hydroperfluoroheptyl)-5-(n-decyloxy)-2-cyclohexene, from bis($\omega$-hydroperfluoroheptyl)-1,2-dithietene and vinyl n-decyl ether.

1,4-dithia-2-trifluoromethyl-3-perfluoropropyl-5-(2-chloroethoxy)-2-cyclohexene, from 3-trifluoromethyl-4-perfluoropropyl-1,2-dithietene and vinyl 2-chloroethyl ether.

1,4-dithia-2,3-bis(perfluoropropyl)-5-methyl-5-(p-methoxyphenyl)-2-cyclohexene, from bis(perfluoropropyl)-1,2-dithietene and $\alpha$-methyl-(p-methoxy)styrene.

1,4-dithia-2,3-bis(perfluorohexyl)-5-(n-butylthia)-2-cyclohexene, from bis(perfluorohexyl)-1,2-dithietene and vinyl n-butyl sulfide.

1,4-dithia-2,3-bis($\omega$-hydroperfluoroundecyl)-5-chloro-2-cyclohexene, from bis($\omega$-hydroperfluoroundecyl)-1,2-dithietene and vinyl chloride.

1,4-dithia-2-trifluoromethyl-4-perfluorododecyl-5,5,6-trifluoro-6-chloro-2-cyclohexene, from 3-trifluoromethyl-4-perfluorododecyl-1,2-dithietene and chlorotrifluoroethylene.

1,4-dithia-2,3-bis(perfluorohexyl)-5-(bromomethyl)-2-cyclohexene, from bis(perfluorohexyl)-1,2-dithietene and allyl bromide.

1,4-dithia-2,3-bis(difluoromethyl)-5,6-difluoro-5,6-di(perfluoromethylene)-2-cyclohexene, from bis(difluoromethyl)-1,2-dithietene and perfluorocyclobutene.

1,4-dithia-2,3-bis(chlorodifluoromethyl)-5-methyl-2-cyclohexene, from bis(chlorodifluoromethyl)-1,2-dithietene and propylene.

1,4-dithia-2,3-bis($\omega$-chloroperfluoroethyl)-5,6,6-trifluoro-5-(trifluoromethyl)-2-cyclohexene, from bis($\omega$-chloroperfluoroethyl)-1,2-dithietene and perfluoropropene.

1,4-dithia-2,3-bis(perfluorododecyl)-5,6,6-trifluoro-5-($\omega$-hydroperfluorohexyl)-2-cyclohexene, from bis-(perfluorododecyl)-1,2-dithietene and $\omega$-hydroperfluoroocetene-1.

1,4-dithia-2,3-bis(ω-hydroperfluoropentyl)-5-(ω-chlorododecyl)-2-cyclohexene, from bis(ω-hydroperfluoropentyl)-1,2-dithietene and 14-chlorotetradecene-1.

1,4 - dithia - 2,3 - bis(ω-chloroperfluorooctyl)-5,6,6-trifluoro-5-dodecyl-2-cyclohexene, from bis(ω-chloroperfluorooctyl)-1,2-dithietene and n-dodecyltrifluoroethylene.

1,4 - dithia - 2,3 - bis(perfluorododecyl) - 5,6-diphenylcyclohexa - 2,5 - diene, from bis(perfluorododecyl)-1,2-dithietene and diphenylacetylene.

1,4 - dithia - 2,3 - bis(ω - chloroperfluorohexyl)-5-hexylcyclohexa-2,5-diene, from bis(ω-chloroperfluorohexyl)-1,2-dithietene and octyne-1.

1,4 - dithia-2,3-bis(perfluoropropyl)-5-(5-bromopentyl)cyclohexa-2,5-diene, from bis(perfluoropropyl)-1,2-dithietene and 7-bromoheptyne.

1,4-dithia-2,3 - bis(chlorodifluoromethyl) - 5 - ethoxycyclohexa-2,5-diene, from bis(chlorodifluoromethyl)-1,2-dithietene and ethoxyacetylene.

1,4 - dithia-2-trifluoromethyl-3-perfluoropropyl-5-chloromethylcyclohexa-2,5-diene, from 3 - trifluoromethyl - 4 - perfluoropropyl-1,2-dithietene and propargyl chloride.

1,4 - dithia - 2,3 - bis(difluoromethyl)-5-benzylcyclohexa-2,5-diene, from bis(difluoromethyl)-1,2-dithietene and benzylacetylene.

1,4-dithia-2,3-bis(ω - hydroperfluorononyl) - 5 - (n - dodecyl)cyclohexa-2,5-diene, from bis(ω-hydroperfluorononyl)-1,2-diethietene and tetradecyne-1.

1,4-dithia-2,3-bis(ω-hydroperfluoropentyl)-5,6-dipropylcyclohexa-2,5-diene, from bis(ω-hydroperfluoropentyl)-1,2-diethietene and octyne-4.

1,4-dithia-2,3-bis(ω - chloroperfluorobutyl) - 5 - propylcyclohexa-2,5-diene, from bis(ω-chloroperfluorobutyl)-1,2-dithietene and pentyne-1.

As already mentioned, the preferred reactants among the compounds having aliphatic or alicyclic carbon-to-carbon unsaturation are those having from 2–14 carbon atoms and in which the multiply bonded carbon atoms are attached to hydrogen or halogen or to hydrocarbon, oxyhydrocarbon (i.e., oxygen-interrupted hydrocarbon), thiahydrocarbon (i.e., sulfur-interrupted hydrocarbon), hydrocarbyloxycarbonyl or halohydrocarbon radicals. Moreover, the most useful among these unsaturates, because they react more readily than others, are those in which the unsaturation is ethylenic and present in an open chain configuration. Other types of unsaturates besides those mentioned above can be used, however, such as esters of acrylic acids (e.g., ethyl acrylate, methyl methacrylate, etc.).

The preferred reactants among the bis(polyfluoroalkyl)-1,2-dithietenes are those in which the polyfluoroalkyl (i.e., perfluoroalkyl, ω-hydroperfluoroalkyl or ω-chloroperfluoroalkyl) groups have from 1–12 carbon atoms. An especially useful class of such reactants comprises the bis(perfluoroalkyl)-1,2-dithietenes in which the perfluoroalkyl groups have from 1–6 carbon atoms.

In accordance with the above discussion, the preferred products made available by this invention are the cyclic bisulfides having one of the formulas (I) 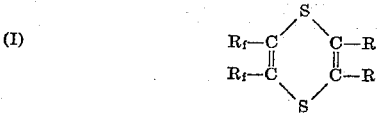

and (II) 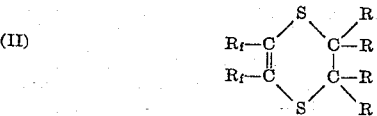

In either formula, $R_f$ is a perfluoroalkyl, ω-hydroperfluoroalkyl or ω-chloroperfluoroalkyl radical of 1–12 carbon atoms, and in the most useful embodiments a perfluoroalkyl radical of 1–6 carbon atoms. In Formula I, the R's are hydrogen or monovalent hydrocarbon, oxy-hydrocarbon, thiahydrocarbon or halohydrocarbon radicals, which radicals together contain a total of up to 12 carbon atoms. In Formula II, the R's are hydrogen, halogen or monovalent hydrocarbon, oxyhydrocarbon, thiahydrocarbon or halohydrocarbon radicals which together contain up to 12 carbon atoms, or two of the R's on adjacent annular carbon atoms can be joined together in a ring structure. The most readily available of these compounds are those derived from an aliphatic unsaturate in which the unsaturation is ethylenic. These compounds correspond to Formula II wherein the R's are hydrogen, halogen or monovalent radicals as defined above.

The fluorinated cyclic bisulfides of this invention are useful in a variety of applications. As a class, they are useful as inhibitors of vinyl polymerization, as shown by the following tests. Freshly distilled vinyl acetate (1.0 ml. per test) was mixed with α,α'-azobis(α,α-dimethyl-valeronitrile) as the polymerization initiator (0.01 g. per test). To each of the test solutions except the control was added 0.05 g. of one of the following compounds:

A. 1,4-dithia-2,3-bis(trifluoromethyl)-2-cyclohexene
B. 1,4-dithia-2,3-bis(trifluoromethyl)-5,5,6,6-tetramethyl-2-cyclohexene
C. 1,4-dithia-2,3-bis(trifluoromethyl)-5,6-diphenyl-2-cyclohexene
D. 1,4-dithia-2,3-bis(trifluoromethyl)cyclohexa-2,5-diene
E. 1,4 - dithia - 2,3-bis(trifluoromethyl)-5-ethoxy-2-cyclohexene.

The test solutions, including the control, were then heated at 60–65° C. for 15 minutes. The increase in viscosity (which reflects the extent of polymerization) was determined by measuring the time required for 0.6 ml. aliquots of each solution to drain out of the same 1-ml. pipette. These times are shown in the table below.

| Additive | None (Control) | A | B | C | D | E |
|---|---|---|---|---|---|---|
| Time (seconds) | 65 | 4 | 4 | 5 | 4 | 4 |

The time required by freshly distilled vinyl acetate in the same test was 4 seconds. Thus, it is seen that each of the compounds tested inhibited the polymerization of vinyl acetate completely or substantially so. Similar results were obtained with other unsaturates which undergo vinyl polymerization, e.g., styrene and methyl methacrylate.

Another general property of the cyclic sulfides of this invention is their solvent power for mineral or vegetable oils and greases, which makes them useful in the degreasing and cleaning of metals, textiles or other soiled objects. For this purpose, they can be used either in the liquid or the vapor phase, or as melts in the case of the normally solid products. Tests were carried out involving compounds A, B, C, and E above and, in addition 1,4 - dithia - 2,3 - bis(trifluoromethyl)-5,6-tetramethylene-2-cyclohexene (compound F). It was found that a mineral oil (commercial sewing machine oil) was soluble to the extent of at least equal weight in all these cyclic sulfides, compounds C and F being used in the molten state for this purpose. A mineral grease (Vaseline petroleum jelly) was soluble to the extent of at least 10% in compound A at 50° C. and in compound F (molten). A vegetable oil (castor oil) was soluble to the extent of at least equal weight in compounds A, B and E.

Those of the cyclic sulfides which have two intracyclic double bonds are capable of gradually liberating sulfur on heating, as already noted. This property makes them useful as rubber curing agents.

Since obvious modifications in the invention will be evident to those skilled in the chemical arts, I propose to be bound solely by the appended claims.

The embodiments of the invention in which an exclusive property or privilege is claimed are defined as follows:

1. The process which comprises reacting an intimate mixture of (1) a dithietene of the formula

wherein $R_f^1$ and $R_f^2$ respectively contain 1–12 carbons and are selected from the group consisting of perfluoroalkyl, omega-hydroperfluoroalkyl and omega-chloroperfluoroalkyl and (2) a compound of 2–14 carbons possessing aliphatic carbon-to-carbon monounsaturation, each of the two carbons connected by the multiple bonds being further connected solely to at least one member of the group consisting of hydrogen, halogen, hydrocarbon, halohydrocarbon, oxyhydrocarbon, thiahydrocarbon and hydrocarbonoxycarbonyl, at a temperature of about 0–250° C. until a cyclic sulfide having a ring with 5 to 6 annular atoms is formed.

2. The process of claim 1 wherein the aliphatic carbon-to-carbon unsaturation is ethylenic.

3. The process of claim 2 wherein the aliphatic carbon-to-carbon unsaturation is cycloaliphatic.

4. The process of claim 1 wherein the aliphatic carbon-to-carbon unsaturation is acetylenic.

5. The process which comprises reacting bis(trifluoromethyl)-1,2-dithietene at a temperature of about 0–250° C. with a monoethylenic compound of 2–14 carbon atoms possessing carbon-to-carbon monounsaturation, each of the two carbons connected by multiple bonds being further connected solely to at least one member of the group consisting of hydrogen, halogen, hydrocarbon, halohydrocarbon, oxyhydrocarbon, thiahydrocarbon and hydrocarbonoxycarbonyl.

6. The process which comprises reacting bis(trifluoromethyl)-1,2-dithietene at a temperature of about 0–250° C. with a monoacetylenic compound of 2–14 carbon atoms possessing aliphatic carbon-to-carbon monounsaturation, each of the two carbons connected by multiple bonds being further connected solely to at least one member of the group consisting of hydrogen, halogen, hydrocarbon, halohydrocarbon, oxyhydrocarbon, thiahydrocarbon and hydrocarbonoxycarbonyl.

7. 1,4 - dithia - 2,3,5,6-tetrakis(trifluoromethyl)cyclohexa-2,5-diene.

8. A compound of the formula

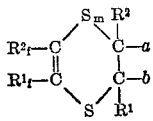

wherein:
(A) $R_f^1$ and $R_f^2$ respectively contain 1–12 carbons and are selected from the group consisting of perfluoroalkyl, omega-hydroperfluoroalkyl and omega-chloroperfluoroalkyl;

(B) $m$ is an integer between 0 and 1, inclusive;
(C) when $m$ is 0, $R^1$ and $R^2$ together contain up to 12 carbons and are selected from the group consisting of hydrogen, monovalent hydrocarbon and hydrocarbonoxycarbonyl, all free of nonaromatic unsaturation, and valence bonds $a$ and $b$ are satisfied by a second bond between the respective depicted annular carbons; and
(D) when $m$ is 1, $R^1$ and $R^2$ are selected from the group consisting of hydrogen, halogen and monovalent hydrocarbon, halohydrocarbon, oxyhydrocarbon and thiahydrocarbon, all free of nonaromatic unsaturation, and valence bonds $a$ and $b$ are satisfied by at least one member of the group consisting of:
(1) hydrogen and monovalent hydrocarbon, halohydrocarbon, oxyhydrocarbon and thiahydrocarbon, all free of nonaromatic unsaturation;
(2) a second bond between the respective depicted annular carbons;
(3) divalent, saturated hydrocarbon and halohydrocarbon of 2 to 4 carbon atoms joined to the respective depicted annular carbons; and
(4)

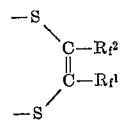

joined to the respective depicted annular carbons, $R_f^1$ and $R_f^2$ being as defined above; the maximum total of carbons in $R^1$ and $R^2$ and in the substituents satisfying $a$ and $b$ being 12.

9. 1,4 - dithia - 2,3 - bis(trifluoromethyl)cyclohexa-2,5-diene.

10. 1,4 - dithia - 2,3 - bis(trifluoromethyl)-5,6-tetramethylene-2-cyclohexene.

11. 1,4 - dithia - 2,3 - bis(trifluoromethyl)-5,6-tetramethylene-2-cyclohexene.

12. 1,4 - dithia - 2,3 - bis(trifluoromethyl)-5,6-dimethyl-2-cyclohexene.

13. 1,4 - dithia - 2,3 - bis(trifluoromethyl)-5,5,6,6-tetrafluoro-2-cyclohexene.

14. 1,4 - dithia - 2,3 - bis(trifluoromethyl)-5,6-diphenyl-2-cyclohexene.

15. 1,4 - dithia - 2,3 - bis(trifluoromethyl) - 5-ethoxy-2-cyclohexene.

16. 1,4 - dithia - 2,3 - bis(trifluoromethyl) - 5-phenyl-cyclohexa-2,5-diene.

17. 1,4,5,8 - tetrathiabicyclo[4.4.0] - 2,3,6,7 - tetrakis(trifluoromethyl)-9,10-diethyldeca-2,6-diene.

18. 1,4,5,8 - tetrathiabicyclo[4.4.0] - 2,3,6,7 - tetrakis(trifluoromethyl)deca-2,6-diene.

No references cited.

UNITED STATES PATENT OFFICE
CERTIFICATE OF CORRECTION

Patent No. 3,073,844            January 15, 1963

Carl G. Krespan

It is hereby certified that error appears in the above numbered patent requiring correction and that the said Letters Patent should read as corrected below.

Column 14, lines 37 and 38, for "5,6-tetra-methylene-2-cyclohexene" read -- 2-cyclohexene --; lines 51 and 53, for "tetrakis", each occurrence, read -- tetrakis- --.

Signed and sealed this 3rd day of September 1963.

(SEAL)
Attest:

ERNEST W. SWIDER
Attesting Officer

DAVID L. LADD
Commissioner of Patents